UNITED STATES PATENT OFFICE.

ISAIAH L. ROBERTS, OF BROOKLYN, NEW YORK.

BATTERY-FLUID.

SPECIFICATION forming part of Letters Patent No. 317,206, dated May 5, 1885.

Application filed November 6, 1884. (No specimens.)

*To all whom it may concern:*

Be it known that I, ISAIAH L. ROBERTS, a citizen of the United States, and a resident of the city of Brooklyn, county of Kings, and State of New York, have invented a new and useful Improvement in Battery-Fluids; and I do hereby declare that the following is a full, clear, and exact description thereof, which will enable others skilled in the art to practice and use the same.

My invention consists in a battery-fluid intended more especially to be used with cells having zinc and carbon elements, though elements of other material may be used.

My fluid consists of permanganate of potash and the salt of an alkali dissolved in water. I use, preferably, a saturated solution of permanganate of potash with water, and leave in the bottom of the cell a few crystals in excess of the quantity taken into solution.

The fluid which I prefer to dissolve the permanganate of potash in is a saturated solution of common table-salt in water, or sal-ammoniac in water, though the salt of any alkali can be used. I include as the salt of an alkali the salts of magnesium, though they are not generally so classified.

What I claim as my invention, and desire to secure by Letters Patent, is—

A battery-fluid consisting of permanganate of potash and the salt of an alkali dissolved in water, combined with the negative and positive elements of a battery-cell, substantially as specified.

ISAIAH L. ROBERTS.

Witnesses:
T. J. KEANE,
W. G. LIPSEY.